United States Patent
Moeller et al.

(10) Patent No.: US 6,580,539 B1
(45) Date of Patent: Jun. 17, 2003

(54) METHOD AND APPARATUS FOR CONTROLLING THE OPTICAL POWER OF AN OPTICAL TRANSMISSION SIGNAL

(75) Inventors: Lothar Benedict Erhard Josef Moeller, Hazlet, NJ (US); Bernd Teichmann, Eckental (DE)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/415,350

(22) Filed: Oct. 8, 1999

(30) Foreign Application Priority Data

Oct. 13, 1998 (EP) .............................. 98308310

(51) Int. Cl.$^7$ ................................. H04J 14/02
(52) U.S. Cl. ...................... 359/124; 359/183
(58) Field of Search ................ 359/124, 337, 359/341, 183, 187; 385/24

(56) References Cited

U.S. PATENT DOCUMENTS

| | | | | |
|---|---|---|---|---|
| 4,560,246 A | * | 12/1985 | Cotter | 359/156 |
| 5,973,812 A | * | 10/1999 | Imai et al. | 359/161 |
| 6,023,366 A | * | 2/2000 | Kinoshita | 359/177 |
| 6,078,414 A | * | 6/2000 | Iwano | 359/110 |
| 6,175,436 B1 | * | 1/2001 | Jackel | 359/124 |
| 6,278,539 B1 | * | 8/2001 | Ooi et al. | 359/237 |

FOREIGN PATENT DOCUMENTS

| | | | |
|---|---|---|---|
| EP | 0 829 981 A2 | 9/1997 | ............ H04J/14/02 |
| WO | WO 98/36513 | 8/1998 | ........... H04B/10/17 |

OTHER PUBLICATIONS

"Fast Link Control Protection For Surviving Channels In Multiwavelength Optical Networks" J.L. Zyskind, et al 22$^{nd}$ European Conference. On Optical Communication Oslo 1996 p. 49–52.

European Search Report, dated Mar. 4, 1999.

* cited by examiner

*Primary Examiner*—Jason Chan
*Assistant Examiner*—Shi K. Li

(57) ABSTRACT

The present invention generally relates to the field of optical transmission and particularly to a method and an apparatus for controlling the optical power of an optical transmission signal in a wavelength division multiplex optical transmission system (WDM system). The optical power of a control channel is controlled to keep the total optical power of the optical transmission signal constant. The present invention avoids the deleterious effects of stimulated Brillouin Scattering by spreading the power density spectrum of the optical control signal.

2 Claims, 2 Drawing Sheets

METHOD AND APPARATUS FOR CONTROLLING THE OPTICAL POWER OF AN OPTICAL TRANSMISSION SIGNAL

CROSS-REFERENCE TO RELATED APPLICATION

This application claims priority of European Patent Application No. 98308310.6, which was filed on Oct. 13, 1998.

TECHNICAL FIELD

The present invention generally relates to the field of optical transmission and particularly to a method and an apparatus for controlling the optical power of an optical transmission signal in a wavelength division multiplex optical transmission system.

BACKGROUND OF THE INVENTION

Wavelength division multiplexing (WDM) is being introduced as a means of increasing the capacity of optical fibre transmission systems. In a WDM system each individual fibre carries a number of optical signals having different wavelengths. When these optical signals are transmitted over long distances, periodic regeneration of the optical signals is necessary. Currently, this regeneration is effected either by demultiplexing the different wavelengths and then converting the optical signals to corresponding electrical signals which are regenerated and then reconverted to optical signals or by using optical amplifiers, e.g. Erbium Doped Fibre Amplifiers (EDFA). Optical amplifiers have the advantage of both relatively low cost and the ability to amplify all used wavelengths without the need for demultiplexing and opto-electronic regeneration. WDM systems currently under development will have eighty or more channels, i.e. modulated optical signals with different wavelengths (known as Dense Wavelength Division Multiplexing, DWDM).

However, if EDFAs are used for regeneration of the optical transmission signal, a problem arises if one or more channels of the optical transmission signal fail or are added to or dropped from the optical transmission signal as EDFAs are sensitive to variations of the input power. In these cases cross saturation in EDFAs will induce power transients in the surviving channels. The surviving channels will suffer error bursts if, e.g., their powers exceed thresholds for optical nonlinearities or become too low to preserve adequate eye opening.

From "FAST LINK CONTROL PROTECTION FOR SURVIVING CHANNELS IN MULTIWAVELENGTH OPTICAL NETWORKS", by J. L. Zyskind et al, $22^{nd}$ European Conference on Optical Communication—ECOC'96, Oslo, pages 49–52, it is known to add one additional channel to the optical transmission signal, for controlling the power of the optical transmission signal. The optical power of the control channel is controlled to keep the total optical power of the optical transmission signal constant, e.g., if a channel of the optical transmission signal fails, the optical power of the control channel is increased to keep the total optical power of the optical transmission signal constant. To change the optical power of the control channel usually the injection current of a laser which generates the control channel is changed as the laser is operated in the continuous wave mode.

As the control channel has to compensate for the power variations of several dozens of channels, the optical power of the control channel can be several times higher than the optical power of a data channel. A non linear effect known as Stimulated Brillouin Scattering (SBS) causes a problem for a not modulated high power optical signal, as used for the control channel, because after the optical power exceeds a threshold, the optical power coupled into the fibre will be reflected within the fibre. The level of that so called Brillouin threshold depends on the material of the fibre used, on the length of the fibre and on the power density spectrum of the optical signal. For an optical signal having a wavelength of 1550 nm and a power density spectrum less than 2 MHz, the Brillouin threshold $P_T$ for a fibre having a length of 30 km is 2–10 mW. As the power of the control channel can be substantially higher, the optical signal forming the control channel is more or less completely reflected.

SUMMARY OF THE INVENTION

Accordingly, it is an object of the present invention to provide a method and an apparatus for controlling the optical power of an optical transmission signal in wavelength division multiplex optical transmission. It is one aim of the inventive method and the apparatus under consideration to avoid the drawbacks known from the state of the art.

According to a first object of the invention there is provided a method for controlling the optical power of an optical transmission signal in a wavelength division multiplex system, comprising adding an optical control signal having a variable optical power to compensate for variations in the optical power of the optical transmission signal, and spreading an associated power density spectrum of the optical control signal.

According to a second object of the invention there is provided an apparatus for controlling the optical power of an optical transmission signal in a wavelength division multiplex system, having a light source means for generating an optical control signal having a variable optical power, a control means for detecting variations in the optical power of the optical transmission signal and controlling in response the optical power of the light source means, an adding means for adding the optical control signal to the optical transmission signal, and means for spreading an associated power density spectrum of the optical control signal.

An advantage of the present invention is that it allows the optical power of an optical transmission signal to be kept at a constant level with the help of a control channel having an optical signal which has an expanded power density spectrum, thus avoiding negative effects of SBS.

The present invention will become more fully understood from the detailed description given hereinafter and further scope of applicability of the present invention will become apparent. However, it should be understood that the detailed description is given by way of illustration only, since various changes and modifications within the spirit and scope of the invention will become apparent to those skilled in the art.

BRIEF DESCRIPTION OF THE DRAWINGS

The following detailed description is accompanied by drawings of which

Identical denotations in different Figures represent identical elements. Bold lines coupling depicted elements in the figures represent optical couplings, e.g. optical fibres, other couplings depicted are electrical couplings.

DETAILED DESCRIPTION

Figure 1:
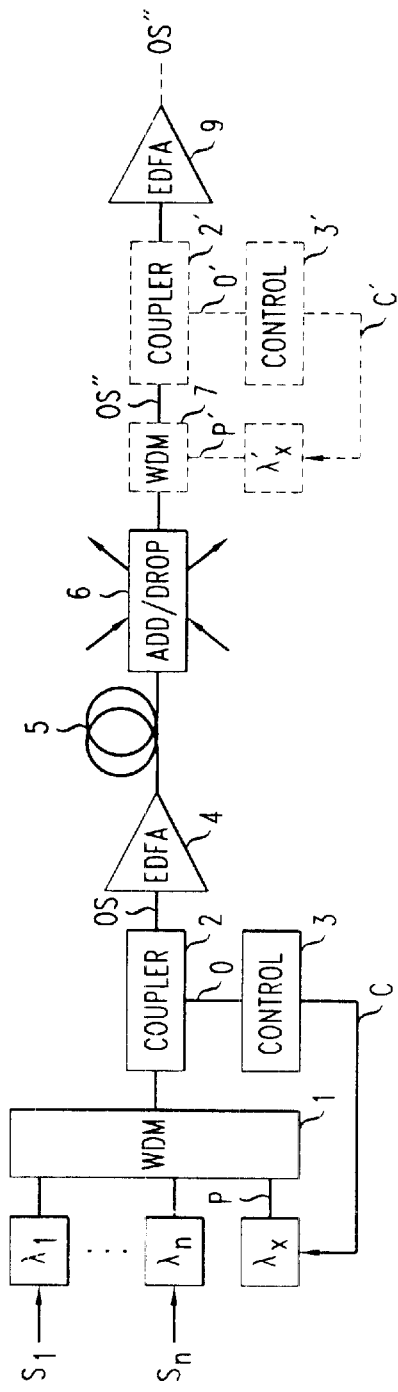
FIG. 1 is a schematic representation of an embodiment of an apparatus for controlling the optical power in a wavelength division multiplex system according to this invention.

Depicted in FIG. 1 is a wavelength division multiplex system having an apparatus for controlling the optical power of an optical transmission signal of the system. The WDM system comprises light sources $\lambda_1 \ldots \lambda_n$, e.g. lasers, at different wavelengths, which are modulated with signals $S_1 \ldots S_n$ to form different optical channels. The different optical channels are combined by a wavelength division multiplexer 1 to form an optical transmission signal OS. The WDM system further comprises an optical amplifier 4, e.g. an EDFA, which amplifies the optical transmission signal OS for the transmission over a transmission path 5, e.g. an optical fibre.

Integrated into the WDM system is an apparatus for controlling the optical power of the transmission signal OS, comprising a coupler 2, a control means 3 and a light source $\lambda_x$, e.g. a laser, which emits a light at a wavelength different from the wavelengths used for the optical channels of the WDM system. The coupler 2 couples out a small amount of the energy of the optical transmission signal OS which has to be controlled and kept at a constant energy level. The coupler 2 is coupled, e.g. with an optical fibre O, to the control means 3. The control means 3 detects variations in the optical power of the optical transmission signal OS and controls the light source $\lambda_x$ in response to the detected variations, e.g. via an electrical coupling C with light source $\lambda_x$, in a way that the optical power of the light source $\lambda_x$ compensates for the detected variations in the optical power of the optical transmission signal OS. An output P of the light source $\lambda_x$ is coupled, e.g. with an optical fibre, to the wavelength division multiplexer 1 to add the optical control signal of the light source $\lambda_x$ to the optical transmission signal OS.

The motivation for of the present invention is to prevent reflection of the optical control signal at output P generated by the light source $\lambda_x$, as could otherwise occur within the fibre of the transmission path 5 because of backscatter arising through SBS. To achieve this, an optical power threshold associated with the onset of SBS has to be increased to avoid reflection. Due to interactions within the fibre, the photons have a mean lifetime before they disintegrate into heat oscillations. If the mean lifetime of the photons is equivalent to a bandwidth B and if the SBS threshold for a not modulated optical carrier signal is $P_{SBS}$, the spectral power density of a modulated optical signal has to be less than $$P = \frac{P_{SBS}}{B} \quad (1)$$

to avoid SBS. Therefore, according to this invention, the optical power of the control channel P is dissipated over a greater range of frequency without causing loss of output power of a laser which is used to generate the optical control signal. This can be achieved by phase modulating the optical control signal, because the phase modulation is widening the spectrum of the modulated optical carrier without attenuating the mean output power, denominated.

Figure 3:
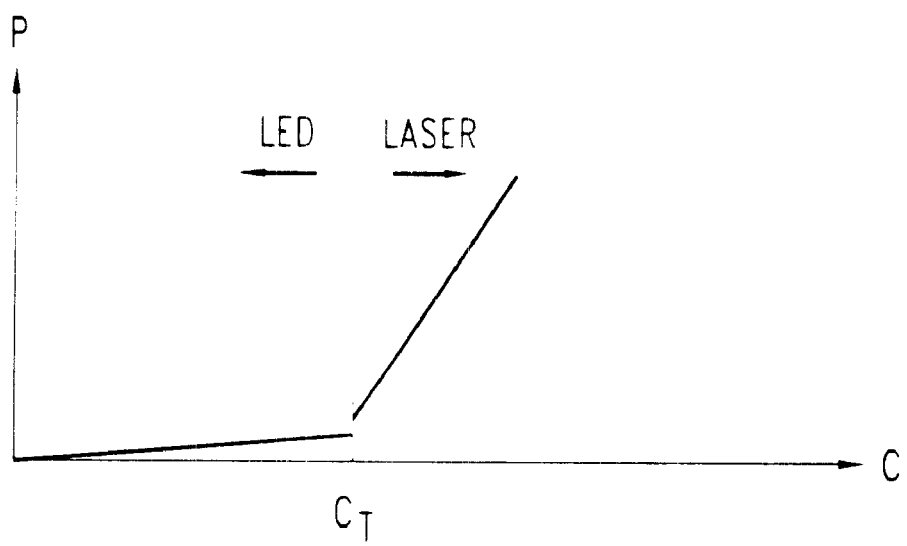
FIG. 3 is a diagram of the optical power emitted by a laser as a function of an injection current fed into the laser.
Figure 4:
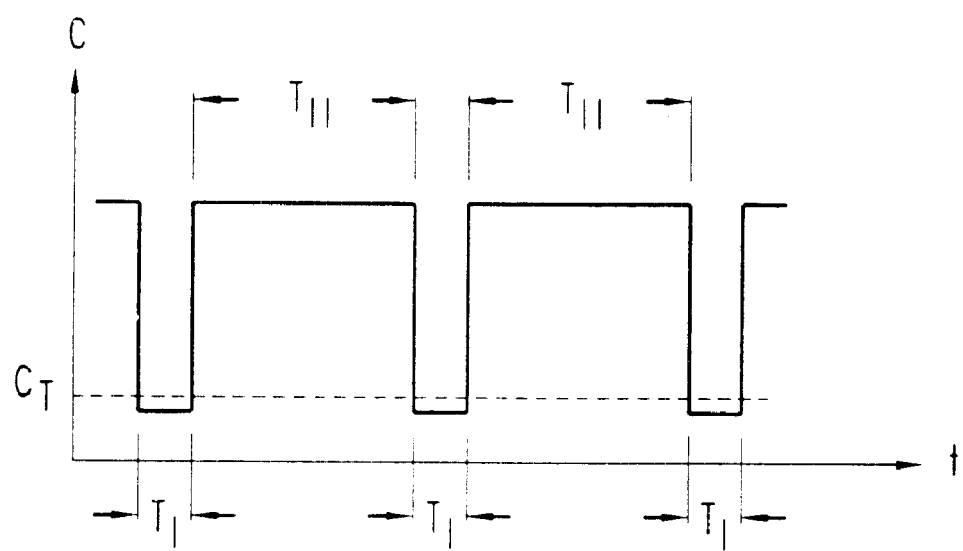
FIG. 4 is a diagram of an injection current fed to a laser as a function of time according to this invention.

In FIGS. 3 and 4 the background for an easy and low cost method to phase modulate an optical carrier is shown.

FIG. 3 shows a diagram of an output power P of a laser, e.g. a semiconductor laser diode, emitted into an optical fibre versus an injection current C fed to the laser. Within a first domain, denominated LED in the figure, the semiconductor laser diode functions as a light emitting diode. The amplification of the active medium is not sufficient to achieve a laser mode. The optical power P emitted is in proportion to the injection current C and the optical power is emitted, i.e. only a small portion of the total optical power emitted is coupled into the fibre. Within a second domain, denominated Laser in the figure, after an injection current threshold $C_T$ is exceeded, the semiconductor laser diode functions as a laser. The optical power emitted is directed by the stimulated emission and the major part of it is coupled into the fibre, except for a small coupling loss.

FIG. 4. shows a diagram of the injection current C fed to the semiconductor laser diode versus time t. If the injection current C is modulated or switched between two levels as shown, wherein one of the levels falls short of the threshold $C_T$, as explained above, the semiconductor laser diode functions as a laser within the periods $T_{II}$ and as a light emitting diode within the periods $T_I$. As the laser mode collapses within the periods $T_I$ it has to be set up again each time a period $T_{II}$ starts. If no additional measures are taken, the phase of the emitted light for the newly set up laser mode has a phase which is not correlated to the phase of the preceding laser mode. In that way the light emitted is phase modulated according to a cost function, wherein the phase difference of light of succeeding laser modes is uniformly distributed over $2\pi$. The period of time $T_I$ necessary for collapsing the laser mode is very short. Therefore, the power level of the optical signal emitted by the semiconductor laser diode is hardly affected by the modulation.

Figure 2:
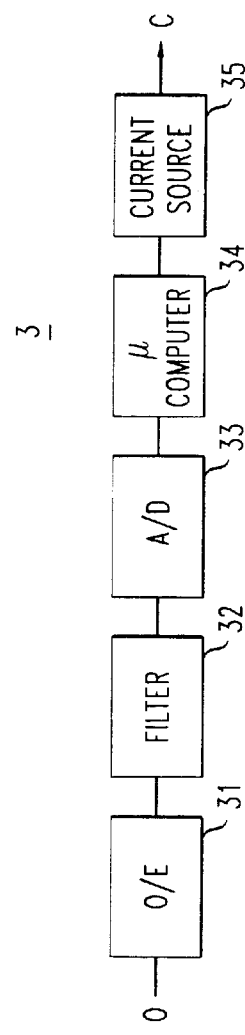
FIG. 2 is a schematic representation of an embodiment of a means for controlling the optical power of an optical transmission signal in a wavelength division multiplex system as shown in FIG. 1.

FIG. 2 depicts a schematic representation of an embodiment of a control means 3 as shown in FIG. 1. The control means 3 comprises an opto-electrical converter 31, e.g. a photo diode, a loop filter 32, an analog/digital converter 33, a microcomputer 34 and a current source 35. At point O a part of the energy of the optical transmission signal OS is coupled into the photo diode 31 which converts the optical transmission signal OS to an electrical signal which is fed into the loop filter 32. The output of filter 32 is coupled to the analog/digital converter 33, which provides binary digits to the microcomputer 34, representative of the power level of the optical transmission signal OS. The microcomputer 34 controls the input of the analog/digital converter 33, if there is a variation in the power of the optical transmission signal OS. If the microcomputer 34 detects a variation, the current used as electrical control signal C for controlling the light source $\lambda_x$, i.e. the semiconductor laser diode, is adjusted according to the variation detected by the microcomputer 34. To phase modulate the optical control signal P generated by light source $\lambda_x$, as explained above, the microcomputer 34 switches the current source 35 between the two current levels, i.e. one current level below the threshold $C_T$, the other accordingly to adjust for the power variation detected.

Instead of using a digital control loop as explained above with reference to FIG. 2, an analog control loop can be used. As the analog control loop avoids the analog/digital conversion, its loop time is shorter.

If, as depicted in FIG. 1, an add and drop multiplexer 6 is present in the transmission path, where optical signals or channels could be added to or removed from the optical transmission signal OS, an additional apparatus as described herein may be used to control the optical power of the optical transmission signal OS. The elements and the function of the additional apparatus are identical to the elements and function as described above. The elements are represented in dashed lines. Corresponding elements are denoted by like reference numerals which in the case of the dashed elements are distinguished by marking with a single quote ('). A part O' of the optical transmission signal OS' is coupled out with a coupler 2', coupled to a control means 3', which is coupled to a light source $\lambda'_x$, which in turn is coupled to an optical wavelength division multiplexer 7. Instead of adding the optical control signal P' with multiplexer 7 an add input of the add and drop multiplexer 6 could be used. After the controlling step, the optical transmission signal OS' is regenerated by EDFA 9, and an optical transmission signal OS" is available for transmission over a further transmission path (not shown).

What is claimed is:

1. A method for controlling the optical power of an optical transmission signal in a wavelength division multiplex system, comprising:

adding an optical control signal having a variable optical power to compensate for variations in the optical power of the optical transmission signal; and phase modulating said optical control signal, thereby to spread an associated power density spectrum of said optical control signal, said phase modulation comprising switching a current fed to a semiconductor laser diode between two levels, wherein the first level falls short of a threshold for laser mode operation of said semiconductor laser diode and the second level is adjusted in accordance with the variations in the optical power of the optical transmission signal.

2. An apparatus for controlling the optical power of an optical transmission signal in a wavelength division multiplex system, comprising:

a light source for generating an optical control signal having a variable optical power, said light source comprising a semiconductor laser diode;

a control element for detecting variations in the optical power of the optical transmission signal and controlling in response the optical power of the light source; and a combining element for adding the optical control signal to the optical transmission signal; wherein:

the apparatus comprises an element for spreading an associated power density spectrum of the optical control signal, said spreading element adapted to phase modulate a current coupled to said semiconductor laser diode by switching said current between two levels;

the first of said two levels of said current falls below a threshold for laser mode operation of said semiconductor laser; and the second of said two levels of said current is adjusted according to the variations of the optical power of the optical transmission signal detected by the control means.

* * * * *